United States Patent [19]

Masuda et al.

[11] Patent Number: 4,659,141

[45] Date of Patent: * Apr. 21, 1987

[54] SAFETY DEVICE FOR VEHICLE SUN ROOF

[75] Inventors: Mitsuyoshi Masuda, Nagoya; Keiki Mori, Toyota; Kazuyoshi Yukimoto, Kariya, all of Japan

[73] Assignee: Aisin Seiki Kabushika Kaisha, Japan

[*] Notice: The portion of the term of this patent subsequent to Aug. 28, 2001 has been disclaimed.

[21] Appl. No.: 501,276

[22] Filed: Jun. 6, 1983

[30] Foreign Application Priority Data

Jun. 7, 1982 [JP] Japan ................... 57-97263

[51] Int. Cl.⁴ .................... B69J 7/057; F16H 1/28
[52] U.S. Cl. .................... 296/223; 74/804
[58] Field of Search .............. 296/220–223; 74/804; 49/348

[56] References Cited

U.S. PATENT DOCUMENTS

| | | | |
|---|---|---|---|
| 3,763,710 | 10/1973 | Kouth et al. | 296/223 |
| 3,948,119 | 4/1976 | Schlapp | 296/223 |
| 4,272,125 | 6/1981 | Bienert et al. | 296/223 |
| 4,420,185 | 12/1983 | Bienert et al. | 296/223 |
| 4,436,338 | 3/1984 | Jardin | 296/223 |
| 4,438,972 | 3/1984 | Katayama et al. | 296/223 |
| 4,466,658 | 8/1984 | Furst et al. | 74/804 |
| 4,468,063 | 8/1984 | Yukimoto et al. | 74/804 |

FOREIGN PATENT DOCUMENTS

| | | | |
|---|---|---|---|
| 5414451 | 3/1978 | Japan. | |
| 0030830 | 2/1983 | Japan | 296/223 |

Primary Examiner—Robert B. Reeves
Assistant Examiner—Dennis H. Pedder
Attorney, Agent, or Firm—Finnegan, Henderson, Farabow, Garrett & Dunner

[57] ABSTRACT

A device for automatically stopping the powered closure of the slidable panel of a vehicle sun roof as the panel approaches its fully closed position under the operation of a driving apparatus. A limit switch attached to the housing interrupts the flow of energy to the driving apparatus when engaged by cooperating structure formed on a cam rotated by an off-set bearing and first and second reduction gears of the driving apparatus. The cam plate is farther driven by a pin engaging a channel within the cam plate. The cooperating structure, which may be a groove or a projection, is so located on the cam as to engage the limit switch only when the slidable panel is close to its fully closed position.

4 Claims, 6 Drawing Figures

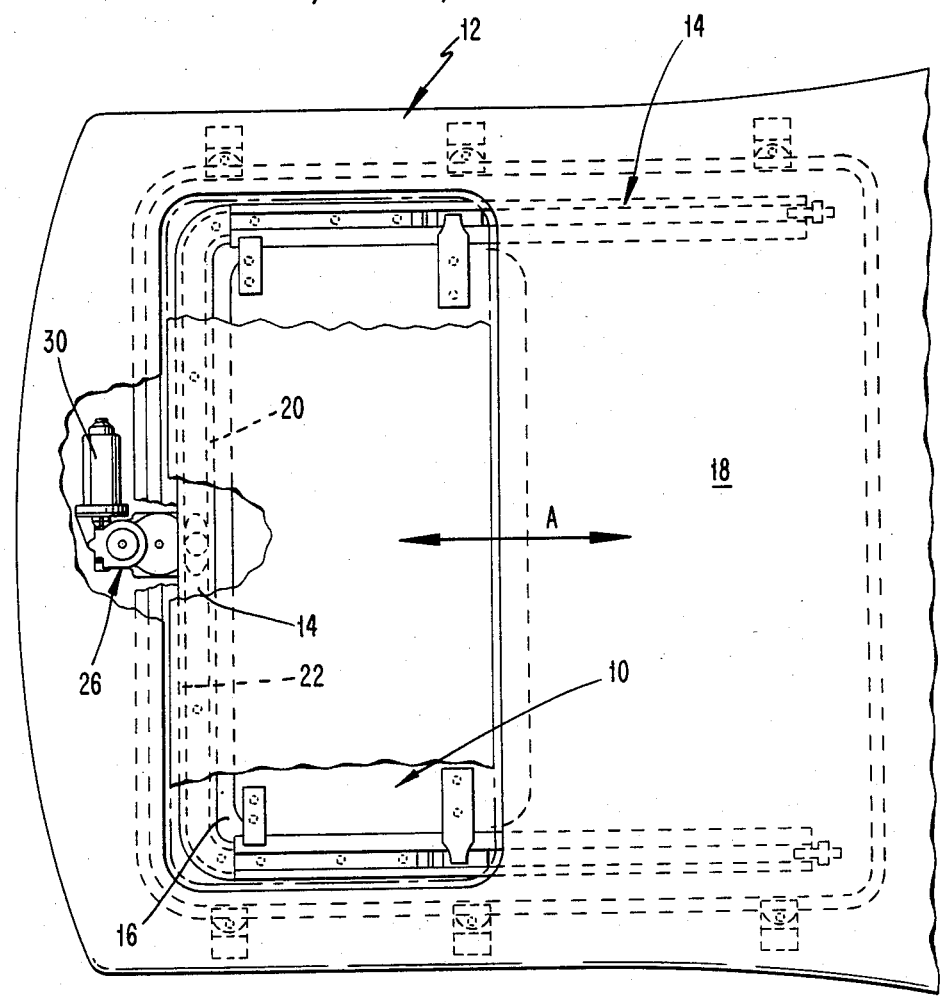

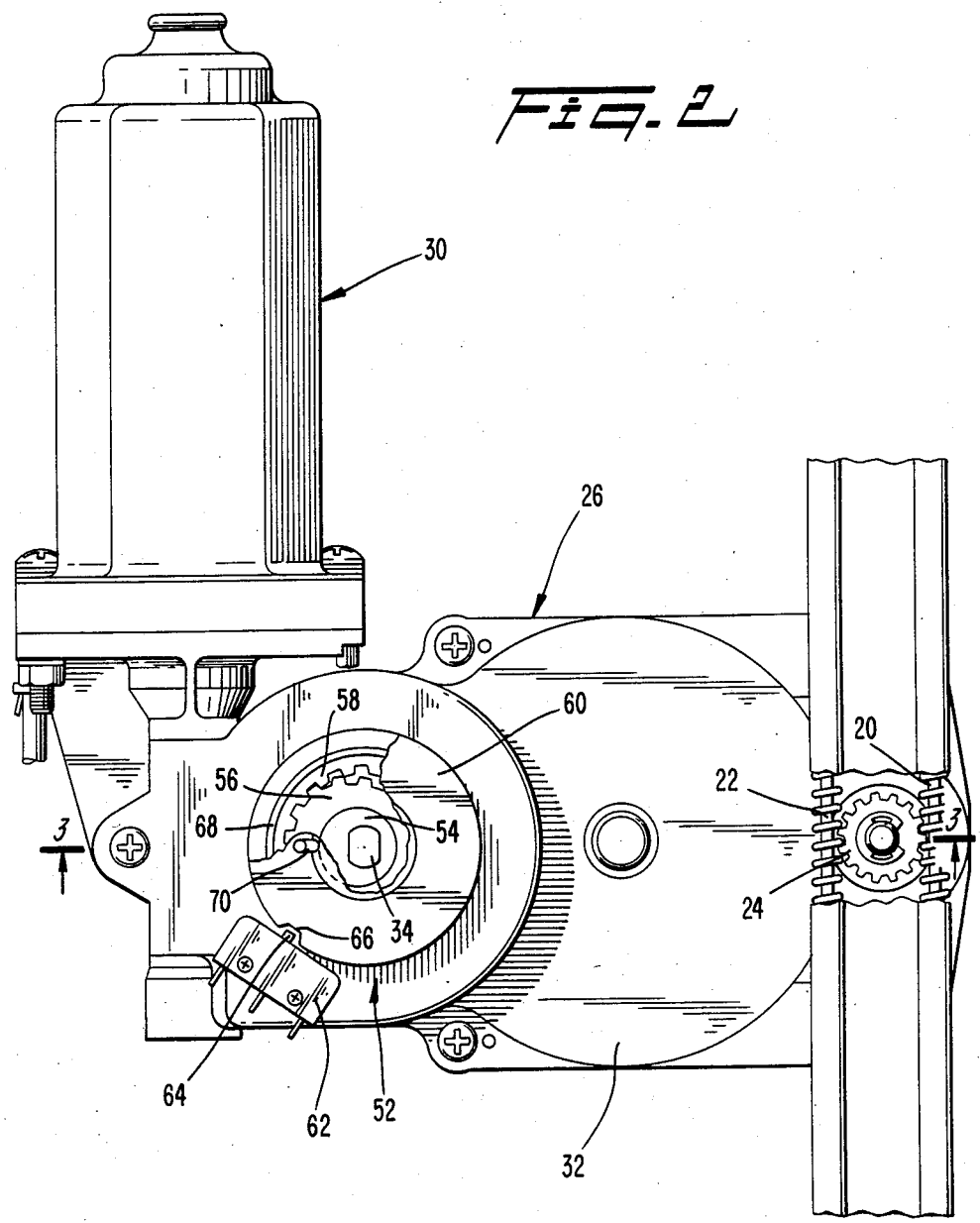

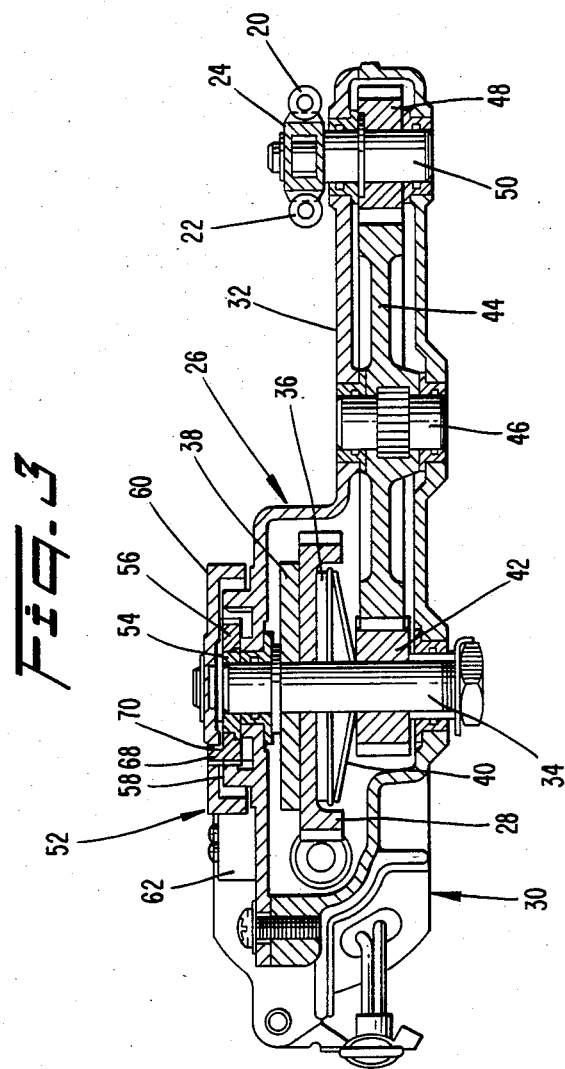

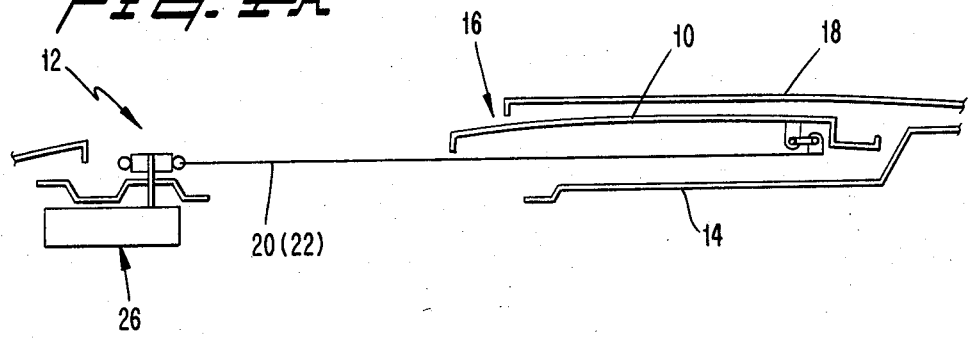
Fig. 4-A
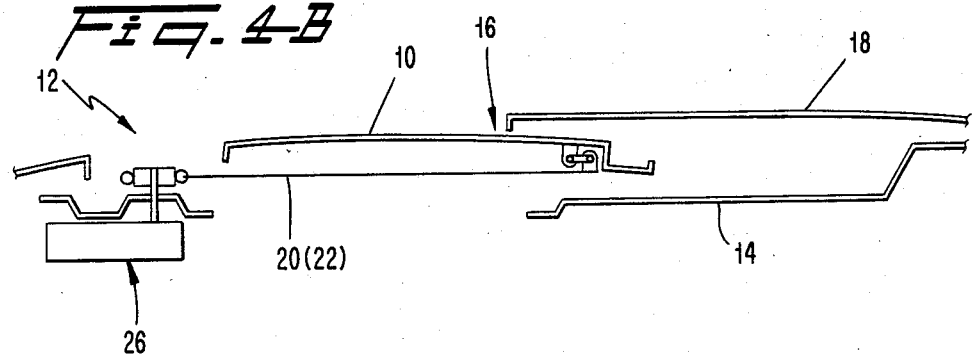
Fig. 4-B
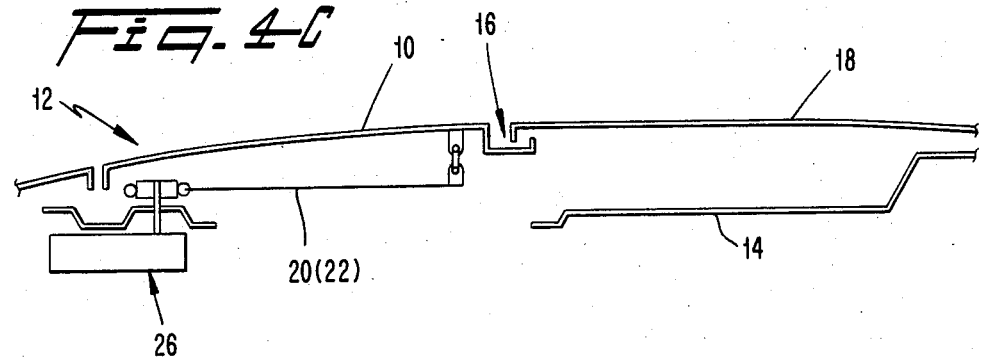
Fig. 4-C

SAFETY DEVICE FOR VEHICLE SUN ROOF

BACKGROUND OF THE INVENTION

1. Field of the Invention

The present invention relates to a safety device for a vehicle sun roof, and more particularly to a safety device for a vehicle sun roof which employs a switch for detecting the position of the sun roof.

2. Description of the Prior Art

In a conventional vehicle sun roof, a sliding panel is assembled with a frame so as to open and close the sun roof. The frame for the sun roof is fixed within an opening in the vehicle roof, and the sliding panel is opened and closed by a driving apparatus which is mounted on a portion of the roof located to the front or the rear of the frame for the sun roof.

In such a type of sun roof, a safety device is provided for stopping the driving apparatus just before the sliding panel reaches its fully closed position, thereby preventing the hand of a passenger from being accidently caught upon the closing of the sliding panel. However, in the conventional safety device a detecting switch on the vehicle roof is generally closed by engagement with a projecting portion provided on a driving cable connected to the sliding panel. The position at which to attach the detecting switch is determined by taking into consideration the position of the projection portion on the driving cable when the sliding panel is in the fully closed position. Therefore, the detecting switch must be necessarily disposed separately from the driving apparatus. As a result, assembly of the sun roof and wiring for the detecting switch within the limited attaching space of the vehicle roof is difficult. In addition several roof elements must be removed in case of repair.

SUMMARY OF THE INVENTION

One object of the present invention is to provide an improved safety device for a sun roof for vehicles which obviates the aforementioned drawbacks of the described conventional safety device of a sun roof.

A further object of the present invention is to provide an improved safety device of a sun roof for vehicles which can be easily assembled and repaired.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and, in accordance with the invention as embodied and broadly described herein, a safety device for a vehicle sun roof having a slidably mounted panel operated by a driving apparatus assembled to an open portion of the vehicle roof and having at least one rotational drive shaft and being mounted within a housing comprises in one embodiment of the invention a cam plate attached to one end of the rotational drive shaft, and a limit switch attached to the housing of the driving apparatus and closed by the cam plate to interrupt the flow of energy to the driving apparatus when the panel approaches the fully closed position thereof under the operation of the driving apparatus.

In one aspect of the invention a safety device for a vehicle sun roof having a slidably mounted panel operated by a driving apparatus assembled to an open portion of the vehicle roof and having at least one rotational drive shaft and being mounted within a housing further comprises an offset bearing attached to the rotational shaft; a first reduction gear rotatably mounted to the offset bearing; and a second reduction gear engaging said first reduction gear with radially inwardly directed teeth formed on the top surface of the housing. In such a safety device the reduction ratio of the first and second reduction gears is determined so as to rotate the cam plate through a predetermined angle upon movement of the panel from the fully opened position to the fully closed position thereof under the operation of the driving apparatus.

In another aspect of the present invention a groove is formed at an outer circumferential portion of the cam plate at such a position thereon as to engage the limit switch just before the panel approaches the fully closed position thereof. In an alternative embodiment, a projection is mounted on an outer circumferential portion of the cam plate at such a peripheral position thereon as to engage the limit switch just before the panel approaches the fully closed position thereof.

BRIEF DESCRIPTION OF THE DRAWINGS

The invention will be described with additional specificity and detail through use of the accompanying drawings in which:

FIG. 1 is a plan view of a sun roof embodying the present invention;

FIG. 2 is an enlarged detail plan view showing the driving apparatus of the sun roof of FIG. 1;

FIG. 3 is an enlarged detail section view of the driving apparatus of FIG. 2 taken along the line 3—3; and FIGS. 4A-C are a series of diagrams illustrating the opening and closing of the sun roof of FIG. 1.

DETAILED DESCRIPTION OF THE PREFERRED EMBODIMENT

Referring now to FIG. 1, reference numeral 10 denotes a sliding panel which is one element of a sun roof 12. A frame 14 for sun roof 12 is fixed to the inner surface of an opening 16 in a vehicle roof 18. Sliding panel 10 is assembled with frame 14 so as to be opened and closed by movement parallel the longitudinal axis of roof 12, in a direction indicated by arrow A. A pair of cables 20,22 are disposed within a lower face of frame 14 at the front portion of the sliding panel 10. One end of each of cables 20,22 is fixed to individual sides of the sliding panel 10, and cables 20,22 are driven in known manner by an engagement with a pinion 24 of a driving apparatus 26 shown in FIGS. 2 and 3 to open or close sliding panel 10 in the manner shown by FIGS. 4A-C.

Viewing FIGS. 2 and 3 together driving apparatus 26 is seen to comprise a gear 28 driven by a motor 30 fixed on one side of a drive apparatus housing 32, a drive shaft 34 rotatably supporting gear 28, clutch plates 36,38 for transmitting the rotation of gear 28 to drive shaft 34 by being pressed against both faces of gear 28 by operation of a spring 40, a gear 42 attached to drive shaft 34 for coaxial rotation therewith, an intermediate gear 44 supported within housing 32 on a shaft 46 and engaged by gear 42, and an output gear 48 supported within the housing 32 on a shaft 50 and engaged by intermediate gear 44. Pinion 24 is fixed on an upper end of the shaft 50 for integral rotation with output gear 48. Accordingly, in driving apparatus 26 pinion 24 is rotated in a forward or a reverse direction by the action of motor 30 driving the series of gears 28,42,44,48, which constitute a reduction gear set, and cables 20,22 move forward or backward with sliding panel 10 accordingly. Other construction details of the drive mechanism for panel 10 are well known, and their further explanation is accordingly omitted.

A safety device 52 constituting a main part of the present invention comprises an off-set bearing 54 attached to the upper end of drive shaft 34, a reduction gear 56 rotatably installed on off-set bearing 54, a reduction gear 58 having radially inwardly directed teeth formed on the top surface of housing 32, and a cam plate 60 rotatably mounted on a tapered portion of the upper end of drive shaft 34. A limit switch 62, which is closed by engagement of a toggle 64 thereof with a groove 66 formed in an outer peripheral portion of cam plate 60, is attached on the top of housing 32 within a concave portion formed therein. Cam plate 60 is assembled such that a pin 68 upstanding from the top surface of reduction gear 56 is inserted into a radially elongated hole 70 provided in cam plate 60. Cam plate 60 is rotated by reduction gear 56 by the movement of pin 68 as it rotates about drive shaft 34 in an off-set fashion determined by the off-center rotation of bearing 54 and reduction gear 56. The reduction ratio of reduction gears 56,58 is set so as to rotate cam plate 60 through a predetermined angle upon movement of sliding panel 10 from the fully opened position to the fully closed position thereof under impetus provided by the associated mechanisms of driving apparatus 26. Groove 66 is provided at an appropriate peripheral position on cam plate 60 so as to engage toggle 64 of limit switch 62 just before sliding panel 10 reaches its fully closed position.

In operation sliding panel 10 is closed from an opened position shown in FIG. 4A by operating driving apparatus 26, which draws cables 20,22 and sliding panel 10 forward into opening 16 in vehicle rod 18, as shown in FIG. 4B. Just before sliding panel 10 reaches its fully closed position, shown in FIG. 4C, limit switch 62 is closed by engagement of toggle 64 with groove 66 in cam plate 60, and the electricity to motor 30 is shut off. Consequently, driving apparatus 26 ceases at this point to rotate and sliding panel 10 is stopped. The electric wiring of limit switch 62 and motor 30 can be similar to that of well-known apparatuses. Accordingly, a detailed explanation of such matters is omitted herein.

In a safety device 52 arranged according to the present invention, cam plate 60 is attached to one end of drive shaft 34 of driving apparatus 26, and limit switch 62, which is closed by the engagement of toggle 64 with groove 66 on cam plate 60, is attached to housin 32 of driving apparatus 26. Accordingly, the assembly of limit switch 62 to the roof of a vehicle is simplified, and the electric wiring associated therewith is also easily installed or repaired. Safety device 52 is in near proximity to driving apparatus 26, so that the attachment and repair of safety device 26 is easily achieved by removing just a part of the roof of the vehicle in which the device is employed.

In the embodiment described above, cam plate 60 is attached to one end of drive shaft 34, and limit switch 62 is attached within a concave portion of the top surface of housing 32. However, the attaching position of the cam plate and the limit switch may be altered suitably according to the shape and the construction of the driving apparatus, and the cam groove of the cam plate may alternatively be replaced with a projection. Cam plate 60 and limit switch 62 can be constructed such that a permanent magnet provided on cam plate 60 actuates limit switch 62 mounted on housing 32.

The foregoing has disclosed a preferred embodiment of a safety device for a sun roof for vehicles constructed in accordance with the present invention. It will be apparent to those skilled in the art that modifications and variations can be made in the apparatus of this invention. The invention in its broader aspect is, therefore, not limited to the specific details, representative methods and apparatus and illustrative examples shown and described. Accordingly, alterations may be made from such details without departing from the spirit or scope of Applicants' general inventive concept.

What is claimed is:

1. A safety device for a vehicle sun roof having a slidably mounted panel operated by a driving apparatus assembled at an opening in the vehicle roof and having at least one rotational drive shaft, said safety device comprising:

an off-set bearing attached to said at least one rotational drive shaft;

a first reduction gear rotatably mounted on said off-set bearing;

a second reduction gear provided on a housing around said rotational drive shaft and further disposed around said first reduction gear, said second reduction gear having radially inward teeth for engagement with said first reduction gear;

a cam plate rotatably attached to one end of said at least one rotational drive shaft, wherein the reduction ratio of said first and second reduction gears is determined so as to rotate said cam plate through a predetermined angle upon movement of said panel from the fully opened position to the fully closed position thereof under the operation of said driving apparatus;

means for slidably connecting said first reduction gear with said cam plate, wherein said slidably connecting means includes a pin provided on said first reduction gear and a radially elongated channel extending along said cam plate, said pin being slidably engaged within said radially elongated channel, enabling said cam plate to rotate in response to the rotation of said first reduction gear;

a limit switch attached to said housing and actuated by said cam plate to interrupt the flow of energy to said driving apparatus just before said panel reaches the fully closed position.

2. A safety device for a vehicle sun roof as recited in claim 1, further comprising a groove formed at an outer circumferential portion of said cam plate at such a peripheral position thereon as to engage said limit switch just before said panel approaches said fully closed position thereof.

3. A safety device for a vehicle sun roof as recited in claim 1, wherein said second reduction gear is integrally formed on said housing.

4. A safety device for a vehicle sun roof as set forth in claim 1, wherein said limit switch includes a projection for engagement with said groove.

* * * * *